(12) United States Patent
Mattos et al.

(10) Patent No.: US 10,599,597 B2
(45) Date of Patent: Mar. 24, 2020

(54) PROGRAMMABLE VBUS DISCHARGE IN USB POWER DELIVERY

(71) Applicant: Cypress Semiconductor Corporation, San Jose, CA (US)

(72) Inventors: Derwin Mattos, San Mateo, CA (US); Godwin Gerald Arulappan, Sunnyvale, CA (US); Syed Raza, San Jose, CA (US); Anup Nayak, Fremont, CA (US); Sumeet Gupta, San Jose, CA (US); Venkat Mandagulathur, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/983,596

(22) Filed: May 18, 2018

(65) Prior Publication Data

US 2019/0278731 A1    Sep. 12, 2019

Related U.S. Application Data

(60) Provisional application No. 62/641,894, filed on Mar. 12, 2018.

(51) Int. Cl.
   *G06F 1/26*     (2006.01)
   *G06F 13/38*    (2006.01)
   *G06F 1/3215*   (2019.01)

(52) U.S. Cl.
   CPC ............ *G06F 13/385* (2013.01); *G06F 1/26* (2013.01); *G06F 1/3215* (2013.01); *G06F 2213/0042* (2013.01)

(58) Field of Classification Search
   CPC ............... G06F 13/385; G06F 1/3215; G06F 2213/0042; G06F 1/266; G06F 13/362; G06F 13/4068; G06F 13/4282; G06F 1/26; H02M 3/33515; H02M 1/08; H02M 1/32; H02M 3/33523; H05F 3/02; H05F 3/04; Y02D 10/14; Y02D 10/151; Y02B 70/16

See application file for complete search history.

(56) References Cited

U.S. PATENT DOCUMENTS

| 8,681,461 | B2 * | 3/2014 | Shrivastava | H02H 9/046 361/111 |
| 8,725,910 | B1 * | 5/2014 | Sala | G06F 13/4081 710/15 |
| 9,804,619 | B2 * | 10/2017 | Motoki | G05F 1/575 |
| 2006/0076977 | A1 * | 4/2006 | Zhu | G06F 13/4081 326/86 |

(Continued)

OTHER PUBLICATIONS

USB Power Delivery Specification Revision 2.0, Version 1.3, Jan. 12, 2017 (Year: 2017).*

(Continued)

*Primary Examiner* — Jaweed A Abbaszadeh
*Assistant Examiner* — Brian J Corcoran

(57) ABSTRACT

Techniques for voltage discharge from a USB Power Delivery (USB-PD) VBUS line are described herein. In an example embodiment, an integrated circuit comprises a discharge control logic coupled to a first discharge circuit and to a second discharge circuit. The first discharge circuit configured to couple to a power source node on the VBUS line. The second discharge circuit configured to couple to an output node on the VBUS line. The discharge control logic is configured to independently control the first discharge circuit and the second discharge circuit to discharge the voltage on the VBUS line.

19 Claims, 10 Drawing Sheets

(56) References Cited

U.S. PATENT DOCUMENTS

| | | | | |
|---|---|---|---|---|
| 2009/0140335 | A1* | 6/2009 | Schneider | H01L 29/0847 257/344 |
| 2013/0238819 | A1* | 9/2013 | Oljaca | G06F 13/4081 710/15 |
| 2014/0369085 | A1* | 12/2014 | Motoki | G06F 1/266 363/21.12 |
| 2015/0380924 | A1* | 12/2015 | Ohwaki | H02H 3/0935 361/93.7 |
| 2016/0056588 | A1* | 2/2016 | Motoichi | H01R 13/7137 439/620.22 |
| 2016/0139640 | A1* | 5/2016 | Hijazi | G06F 1/26 361/679.31 |
| 2017/0242707 | A1* | 8/2017 | Hays | G06F 13/385 |
| 2017/0290134 | A1* | 10/2017 | Sun | H01R 24/64 |
| 2018/0019587 | A1* | 1/2018 | Chen | H02H 7/1213 |

OTHER PUBLICATIONS

Microchip. Introduction to USB Type-C. Introduction to USB Type-C, Microchip, 2015 (Year: 2015).*

Intel. From Sand to Silicon "Making of a Chip" Illustrations, Intel, 2009 (Year: 2009).*

USB 3.0 Promoter Group, Universal Serial Bus Type-C Cable and Connector Specification (v 1.3, Jul. 14, 2017 redlined version of v. 1.2, Mar. 25, 2016), pp. 21-23, USB 3.0 Promoter Group, 2017 (Year: 2017).*

"Universal Serial Bus Type-C Cable and Connector Specification," USB 3.0 Promoter Group, Release 1.0, Aug. 11, 2014, pp. 1-171; 171 pages.

Dunstan, Bob, "Universal Serial Bus Power Delivery Specification," Intel Corporation, Revision 1.0, Jul. 5, 2012. pp. 1-303; 303 pages.

International Search Report for International Application No. PCT/US2019/20766 dated Apr. 8, 2019; 2 pages.

Written Opinion of the International Searching Authority for International Application No. PCT/2019/20766 dated Apr. 18, 2019; 7 pages.

* cited by examiner

US 10,599,597 B2

PROGRAMMABLE VBUS DISCHARGE IN USB POWER DELIVERY

PRIORITY

This application claims the priority and benefit of U.S. Provisional Application No. 62/641,894, filed on Mar. 12, 2018, which is incorporated by reference herein in its entirety.

TECHNICAL FIELD

This disclosure relates to integrated circuits that control power delivery to electronic devices.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Thus, under certain power delivery conditions, the provided voltages/currents may need to be discharged quickly, but this may expose the integrated circuit device that controls the provision of such voltages/currents to heating and latch-up.

DETAILED DESCRIPTION

Figure 1A:
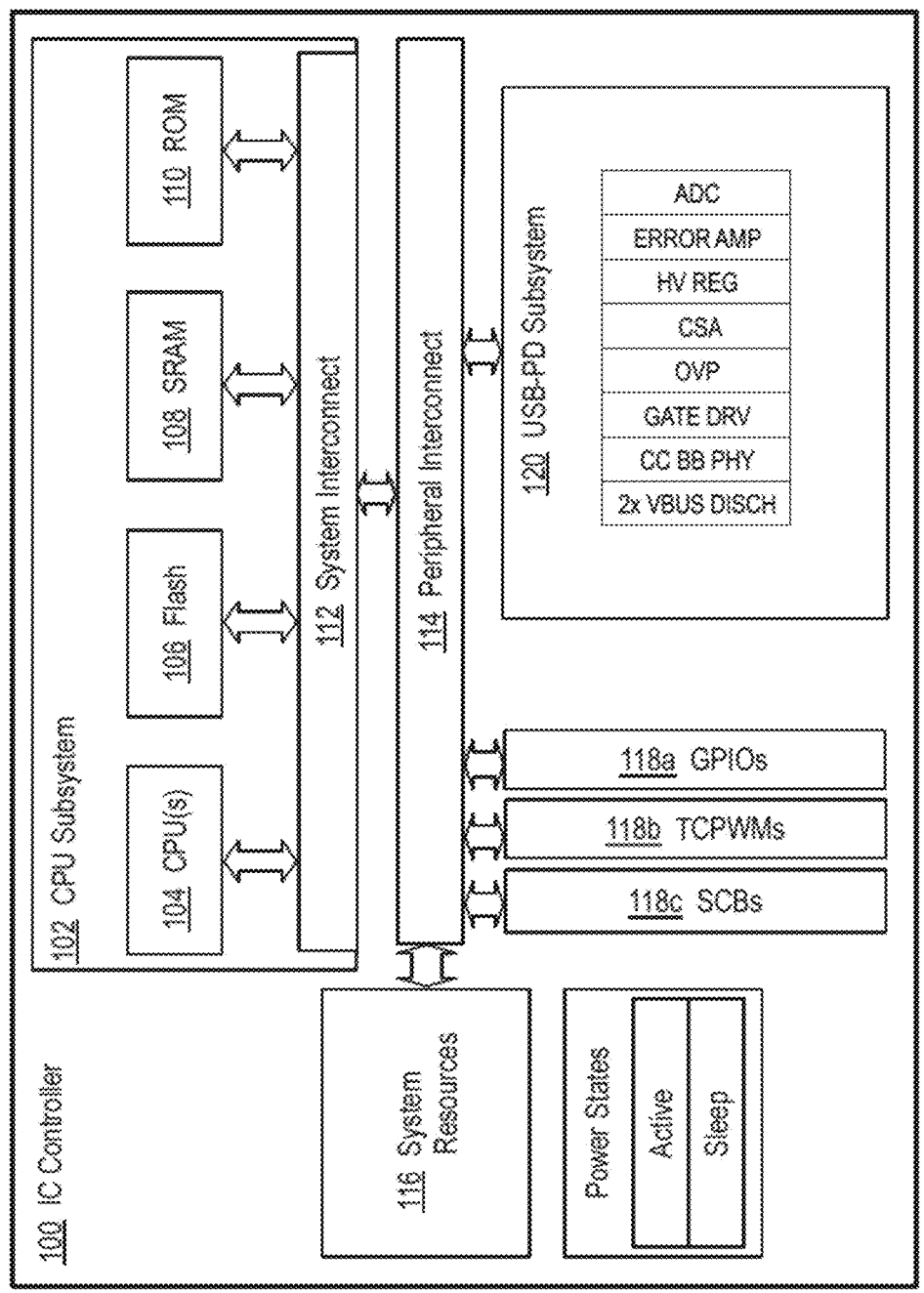
FIG. 1A illustrates an example on-die integrated circuit (IC) controller with a USB-PD subsystem in accordance with some embodiments.

The following description sets forth numerous specific details such as examples of specific systems, components, methods, and so forth, in order to provide a good understanding of various embodiments of the techniques described herein for voltage discharge from a USB VBUS line. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for voltage discharge from a USB VBUS line in electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an AC power adapter or from another AC source. Thus, as part of an AC-to-DC conversion, some implementations use a large bulk capacitor on the power source side of the VBUS line in order to remove the AC component of the power signal. Such a bulk capacitor can be quite large (e.g., 1 mF to 6 mF) and may cause very high currents on the VBUS line with risk of heating and IC controller latch-up. For this reason, under certain conditions a USB-PD power source is required to discharge the bulk capacitor (on the power source side) and the voltage on the power sink side of the VBUS line very quickly. However, it is not trivial to quickly discharge the voltage on the VBUS line by using an IC controller, given that the VBUS line may carry up to 5 A of current at up to 20V, for a total of up to 100 W of power.

For example, some contemporaneous implementations are configured to discharge the VBUS voltage only on the output (power sink) side of the VBUS line through external components (e.g., such as very large resistors). Thus, these implementations suffer from higher bill-of-materials (BOM) costs and do not provide protection against a possible discharge of a live supply on the VBUS line (e.g., a large amount of current, driven by a power source, that is not applied to or consumed by a load). Further, such implementations typically discharge the VBUS voltage all the way down to substantially 0V, which can result in large currents flowing to ground for a significantly longer period of time (thereby causing excessive heating) and in loss of power to operate the USB controller chip.

To address these and other disadvantages of contemporaneous implementations of USB-PD VBUS voltage discharge, the techniques described herein provide an IC controller with multiple independently-controlled, on-die discharge circuits configured to discharge voltage from a VBUS line. Under certain events and/or conditions on the VBUS line—like a VBUS swap event, detach condition, and fault conditions (e.g., over-current, short circuit, over-voltage, reverse current, etc.)—a USB-PD controller is required to quickly discharge the voltage on its power source and power sink nodes. In accordance with the techniques described herein, the IC controller detects these events/conditions and discharges the VBUS voltage by driving current from the VBUS line to a USB ground line through one or more of the on-die discharge circuits at a programmable discharge rate. In this manner, the techniques described herein allow discharge of the voltage on the VBUS line to any of multiple, programmable voltage levels with protection against high currents and live supply discharge, but without requiring any external/off-chip discharge components.

In example embodiments of the techniques described herein, an IC controller includes two internal, on-die discharge circuits configured to couple to a VBUS line and to reduce the voltage on the VBUS line during negative voltage transitions thereon. One of the discharge circuits operates to discharge VBUS voltage from a node at the power source side of the VBUS line, and the other discharge circuit operates to discharge VBUS voltage from a node at the power sink of the VBUS line. The two discharge circuits can also be configured to discharge the VBUS voltage to meet the USB-PD specified timing on a detach condition. The discharge circuit on the power source side can also be used to accelerate the ramp down of the VBUS voltage to the default 5V at the power sink side, without drawing the VBUS voltage all the way down to substantially 0V. With respect to dynamically re-negotiated PD contracts, the techniques described herein allow the voltage on the VBUS line to be monitored and pulled down only to the desired non-zero voltage level (e.g., from 12V down to 9V).

As used herein, "logic" refers to a hardware block having one or more circuits that include various electronic components configured to process analog and/or digital signals and to perform one or more operations in response to control signal(s). Examples of such electronic components include, without limitation, transistors, diodes, resistors, capacitors, inductors, logic gates, and various circuits thereof "USB-PD subsystem" refers to one or more logic blocks and other analog/digital hardware circuitry, which may be controllable by firmware in an integrated circuit (IC) controller and which is configured and operable to perform the functions and to satisfy the requirements specified in at least one release of the USB-PD specification.

In an example embodiment, an IC comprises a USB-PD subsystem that is disposed in a monolithic (e.g., single) semiconductor die. The USB-PD subsystem includes a discharge control logic coupled to control at least two on-die discharge circuits. The first discharge circuit is configured to couple to a power source node on a VBUS line, and the second discharge circuit is configured to couple to an output node on the VBUS line. The discharge control logic is configured to independently control the first discharge circuit and the second discharge circuit to discharge the voltage on the VBUS line. In one example aspect, the power source node is disposed on one side of a power switch on the VBUS line and the output node is disposed on the other side of the power switch on the VBUS line. In one aspect, the IC further comprises a first input pin coupled to the first discharge circuit, a second input pin coupled to the second discharge circuit, and one or more ground output pins coupled to the first discharge circuit and the second discharge circuit. In another aspect, the IC further comprises a power pin configured to couple to the power source node on the VBUS line, where the USB-PD subsystem is configured to be powered from the power pin. In one aspect, the IC further comprises firmware instructions to control a drive strength schedule that is applied by the discharge control logic to at least one of the first discharge circuit and second discharge circuit. In an example aspect, the USB-PD subsystem further comprises a voltage threshold detector coupled to the discharge control logic and configured to monitor the voltage on the VBUS line at the power source node and at the output node with respect to multiple voltage levels. In an example aspect, the USB-PD subsystem further comprises protection logic coupled to the discharge control logic and configured to monitor a discharge rate of the voltage on the VBUS line and to protect against discharging a live supply voltage. In one aspect, the discharge control logic is configured to generate multi-bit control signals that are applied to the first discharge circuit and to the second discharge circuit, where the multi-bit control signals control the amount of current discharged from the VBUS line in a step-wise manner. In another aspect, each of the first discharge circuit and the second discharge circuit comprises one or more drain-extended field-effect transistors (DEFETs) that are capable of withstanding a high (e.g., ~30V) drain-to-source voltage. In an example aspect, the discharge control logic is configured to control the first discharge circuit to discharge the voltage on the VBUS line at a first discharge rate and to control the second discharge circuit to discharge the voltage on the VBUS line at a second discharge rate. In one aspect, the discharge control logic is configured to stop discharging of the voltage on the VBUS line at a non-zero voltage level. In another aspect, the USB-PD subsystem further comprises a voltage threshold detector configured to monitor the voltage on the VBUS line, a current sense detector configured to monitor current returned on a USB ground line, and a fault detector coupled to the current sense detector and to the voltage threshold detector and configured to detect one or more fault events on the VBUS line.

In another example embodiment, an apparatus/system comprises a USB Type-C connector and an IC coupled thereto to control power transfer on the VBUS line of the connector. The IC comprises a first discharge circuit coupled to a power source node on the VBUS line, a second discharge circuit coupled to an output node on the VBUS line, and a discharge control logic coupled to the first discharge circuit and to the second discharge circuit and configured to independently control the first discharge circuit and the second discharge circuit to discharge voltage on the VBUS line. In an example aspect, the apparatus further comprises a power switch coupled in-line on the VBUS line, where the power source node is disposed on one side of the power switch and the output node is disposed on the other side of the power switch. In one aspect, the IC comprises a first input pin that couples the first discharge circuit to the power source node, a second input pin that couples the second discharge circuit to the output node, and one or more ground output pins that couple the first discharge circuit and the second discharge circuit to a local ground. In another aspect, the IC is configured to control transfer of power over the VBUS line in accordance with a USB-PD specification. In one aspect, the IC is configured to control a discharge rate of the voltage on the VBUS line, and in another aspect the IC is configured to monitor the voltage on the VBUS line with respect to multiple voltage levels. In various aspects, the apparatus can be a PC power adapter, a mobile phone charger, a wall socket, a car charger, or a power bank.

In another example embodiment, a method for controlling power transfer on a VBUS line by a discharge control logic disposed in an IC controller comprises: controlling a first discharge circuit to discharge voltage from a power source node on the VBUS line; and controlling, by the discharge control logic, a second discharge circuit to discharge the voltage from an output node on the VBUS line; where the first discharge circuit and the second discharge circuit are controlled independently of each other. In one aspect, the power source node is disposed on one side of a power switch on the VBUS line and the output node is disposed on the other side of the power switch on the VBUS line. In an example aspect, the method further comprises: receiving first current from the VBUS line at a first input pin, of the IC controller, that is coupled to the first discharge circuit; receiving second current at a second input pin, of the IC controller, that is coupled to the second discharge circuit; and discharging the first and second currents to one or more ground output pins, of the IC controller, that are coupled to the first and second discharge circuits. In another aspect, the method further comprises drawing power for the IC controller through a power pin thereof that is coupled to the power source node on the VBUS line. In one aspect, the method further comprises monitoring the voltage on the VBUS line at the power source node and at the output node with respect to multiple voltage levels. In an example aspect, the method further comprises monitoring a discharge rate of the voltage on the VBUS line. In one aspect the method further comprises protecting the IC controller against discharging a live supply voltage on the VBUS line, and in another aspect the method further comprises generating multi-bit control signals and applying the multi-bit control signals to the first and second discharge circuits. In an example aspect, the method further comprises controlling the first discharge circuit to discharge the voltage on the VBUS line at a first discharge rate and controlling the second discharge circuit to discharge the voltage on the VBUS line at a second discharge rate. In one aspect, the method further comprises ceasing to discharge the voltage on the VBUS line at a non-zero voltage level. In another aspect, the method further comprises monitoring the current returned to a USB ground line and detecting one or more fault events on the VBUS line.

FIG. 1A illustrates an example semiconductor device that is configured in accordance with the techniques for VBUS voltage discharge described herein. In the embodiment illustrated in FIG. 1A, device 100 is an IC controller manufactured on a semiconductor die. For example, IC controller 100 may be a single-chip IC device from the family of CCGx USB controllers developed by Cypress Semiconductor Corporation, San Jose, Calif. In another example, IC controller 100 may be a single-chip IC that is manufactured as a System-on-Chip (SoC). In other embodiments, the IC controller may be a multi-chip module encapsulated in a single semiconductor package. Among other components, IC controller 100 includes CPU subsystem 102, peripheral interconnect 114, system resources 116, various input/output (I/O) blocks 118 (e.g., 118a-118c), and USB-PD subsystem 120.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in an IC or a SoC device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a sleep state, thereby allowing power to be switched off when the IC chip is in the sleep state. Flash memory 106 is non-volatile memory (e.g., NAND flash, NOR flash, etc.) that is configured for storing data, programs, and/or other firmware instructions. Flash memory 106 is tightly coupled within the CPU subsystem 102 for improved access times. SRAM 108 is volatile memory that is configured for storing data and firmware instructions accessed by CPU 104. ROM 110 is read-only memory (or other suitable storage medium) that is configured for storing boot-up routines, configuration parameters, and other firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks 118, and USB-PD subsystem 120. The peripheral interconnect 114 may include various controller circuits (e.g., direct memory access, or DMA controllers), which may be programmed to transfer data between peripheral blocks without burdening the CPU subsystem 102. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem may also include circuits that allow IC controller 100 to draw and/or provide power from/to external sources with several different voltage and/or current levels and to support controller operation in several power states (e.g., sleep and active states). System resources 116 may also include a clock subsystem that provides various clocks that are used by IC controller 100, as well as circuits that implement various controller functions such as external reset.

An IC controller, such as IC controller 100, may include various different types of I/O blocks and subsystems in various embodiments and implementations. For example, in the embodiment illustrated in FIG. 1A, IC controller 100 includes GPIO (general purpose input output) blocks 118a, TCPWM (timer/counter/pulse-width-modulation) blocks 118b, SCBs (serial communication blocks) 118c, and USB-PD subsystem 120. GPIOs 118a include circuits configured to implement various functions such as, for example, pull-ups, pull-downs, input threshold select, input and output buffer enabling/disabling, multiplex signals connected to various I/O pins, etc. TCPWMs 118b include circuits configured to implement timers, counters, pulse-width modulators, decoders and various other analog/mixed signal elements that are configured to operate on input/output signals. SCBs 118c include circuits configured to implement various serial communication interfaces such as, for example, I²C, SPI (serial peripheral interface), UART (universal asynchronous receiver/transmitter), CAN (Controller Area Network) interface, CXPI (Clock eXtension Peripheral Interface), etc.

USB-PD subsystem 120 provides the interface to a USB Type-C port and is configured to support USB communications as well other USB functionality, such as power delivery and battery charging. USB-PD subsystem 120 includes the electro-static discharge (ESD) protection circuits required on a Type-C port. USB-PD subsystem 120 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. USB-PD subsystem 120 also provides the termination resistors ($R_P$ and $R_D$) and their switches, as required by the USB-PD specification, to implement connection detection, plug orientation detection, and power delivery roles over a Type-C cable. IC controller 100 (and/or the USB-PD subsystem 120 thereof) may also be configured to respond to communications defined in a USB-PD Specification such as, for example, SOP, SOP', and SOP" messaging.

Among other circuitry, USB-PD subsystem 120 may further include: an analog-to-digital convertor (ADC) for converting various analog signals to digital signals; an error amplifier (ERROR AMP) for controlling the power source voltage applied to the VBUS line per a PD contract; a high voltage regulator (HV REG) for converting the power source voltage to the precise voltage (e.g., 3-5V) needed to power IC controller 100; a current sense amplifier (CSA) and an over-voltage protection (OVP) circuit for providing over-current and over-voltage protection on the VBUS line with configurable thresholds and response times; one or more gate drivers (GATE DRV) for controlling the power switches that turn on and off the provision of power over the VBUS line; and a communication channel PHY (CC BB PHY) logic for supporting communications on a Type-C Communication Channel (CC) line.

In accordance with the techniques described herein, USB-PD subsystem 120 includes a discharge control logic coupled to control at least two on-die discharge (VBUS DISCH) circuits that can discharge a VBUS line voltage to a range of voltage levels. The first discharge circuit is configured to couple to a power source node on the VBUS line, and the second discharge circuit is configured to couple to an output (power sink) node on the VBUS line. The discharge control logic is configured to independently control the first discharge circuit and the second discharge circuit to discharge the voltage on the VBUS line to the desired voltage level (e.g., as negotiated in a PD contract).

Figure 1B:
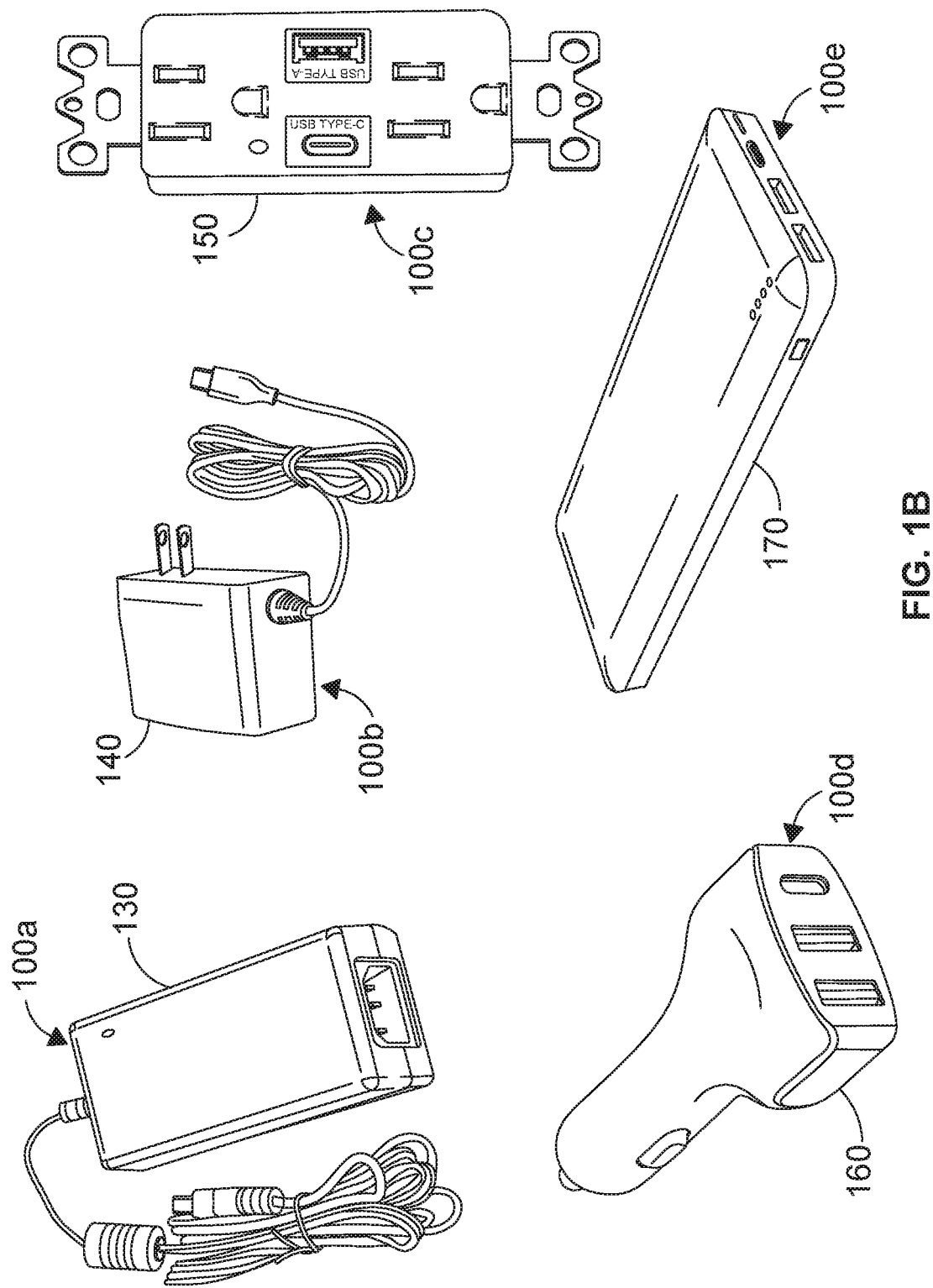
FIG. 1B illustrates example devices that can include the IC controller of FIG. 1A, according to some embodiments.

FIG. 1B illustrates example application contexts in which the described techniques for VBUS voltage discharge may be implemented. In each of these application contexts, an IC controller (such as IC controller 100 of FIG. 1A) can be disposed and configured in an electronic device (e.g., a USB-enabled device) to perform operations in accordance with the techniques described herein. In one example embodiment, an IC controller 100a may be disposed and configured in a personal computer (PC) power adapter 130 for a laptop, a notebook computer, etc. In another example embodiment, an IC controller 100b may be disposed and configured in a power adapter (e.g., a wall charger) 140 for a mobile electronic device (e.g., a smartphone, a tablet, etc). In another example embodiment, an IC controller 100c may be disposed and configured in a wall socket 150 that is configured to provide power over USB Type-A and/or Type-C port(s). In another example embodiment, an IC controller 100d may be disposed and configured in a car charger 160 that is configured to provide power over USB Type-A and/or Type-C port(s). In yet another example embodiment, an IC controller 100e may be disposed and configured in a power bank 170 that can get charged and then provide power to another electronic device over a USB Type-A or Type-C port. In other embodiments, an IC controller configured with the VBUS discharge circuitry described herein may be disposed in various other USB-enabled electronic or electro-mechanical devices.

It should be understood that an IC controller (such as IC controller 100 of FIG. 1A) can be disposed into different applications, which may differ with respect to the type of power source being used and the direction in which power is being delivered. For example, in the case of car charger 160 the power source is a car battery that provides DC power, while in the case of mobile power adapter 140 the power source is an AC wall socket. Further, in the case of PC power adapter 130 the flow of power delivery is from a provider device to consumer device, while in the case of power bank 170 the flow of power delivery may be in both directions depending on whether the power bank is operating as a power provider (e.g., to power another device) or as a power consumer (e.g., to get charged itself). For these reasons, the various IC controller applications illustrated in FIG. 1B should be regarded in an illustrative rather than a restrictive sense.

Figure 2:
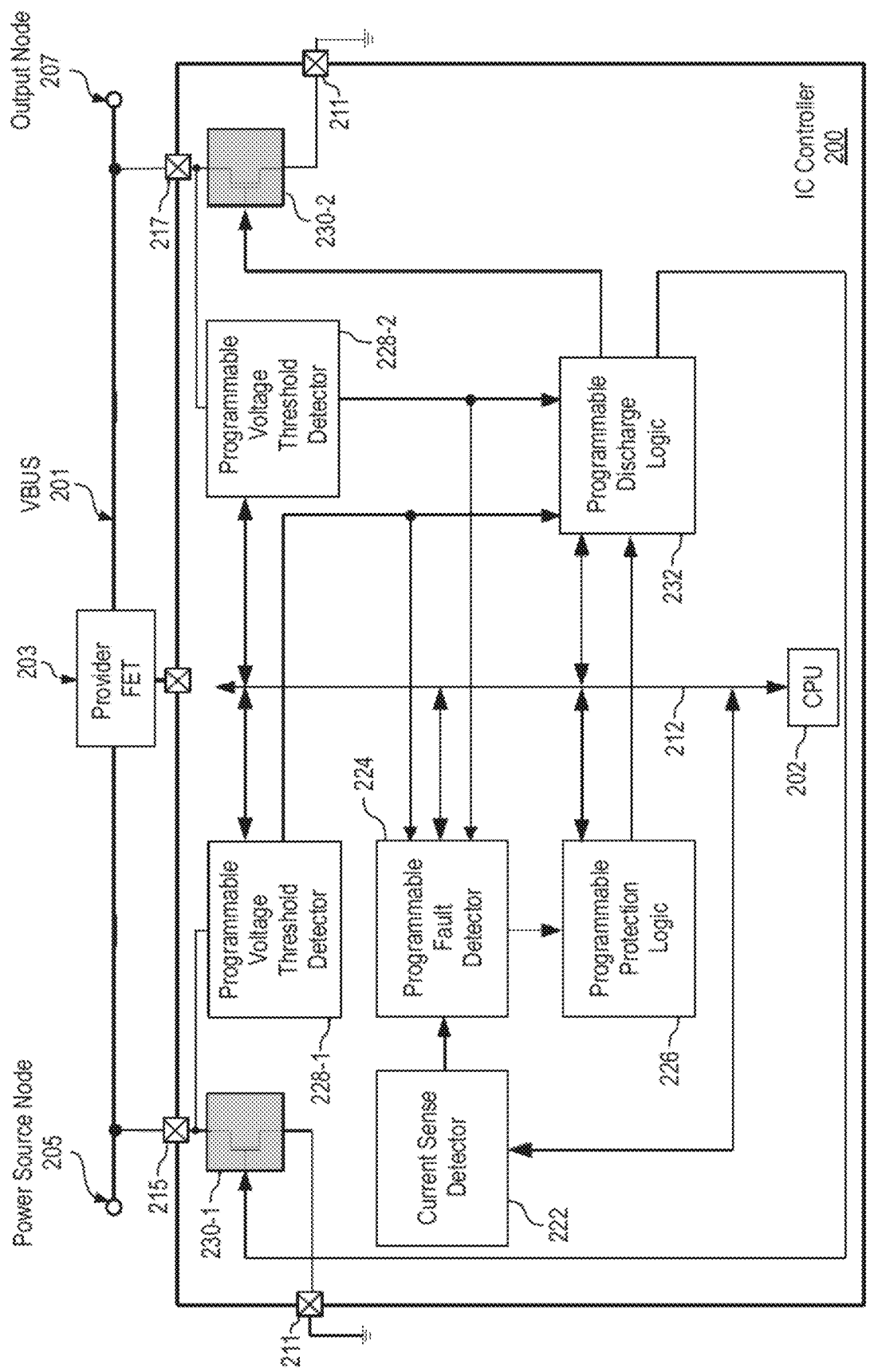
FIG. 2 illustrates a schematic diagram of an example IC controller configured for programmable voltage discharge from a USB voltage (VBUS) line, according to some embodiments.

FIG. 2 illustrates a schematic diagram of an IC controller (e.g., such as IC controller 100 in FIG. 1A) in accordance with the techniques for VBUS voltage discharge described herein. IC controller 200 is coupled to VBUS line 201 and is configured to control the discharge of VBUS voltage during negative voltage transitions thereon. VBUS line 201 includes power switch 203 that is configured as an on/off switch device controlled by a gate driver in IC controller 200. On one side of power switch 203, a power source node 205 (e.g., a bulk capacitor node) on the VBUS line is coupled to a power source, such as a power adapter (not shown). Power source node 205 is coupled to input pin 215 of IC controller 200. On the other side of power switch 203, an output node 207 (e.g., a sink node, or consumer node) on the VBUS line is coupled to a USB Type-C receptacle or plug (not shown). Output node 207 is coupled to input pin 217 of IC controller 200.

Power switch 203 includes one or more power Field Effect Transistors (power FETs). A power FET may be an N-channel or a P-channel transistor. Power FETs differ in some important characteristics from FETs and other types of transistor switch devices that are used for other, non-power-transfer applications. As a discrete semiconductor switching device, a power FET needs to carry a large amount of current between its source and its drain while it is on, to have very low resistance from its source to its drain while it is off, and to withstand high voltages from its source to its drain while it is off. In some embodiments, the same IC controller 200 may be configurable to control either a power switch with N-channel power FET(s) or a power switch with P-channel power FET(s), depending on the type of power switch that is coupled on the external power path over VBUS line 201.

Among other components, IC controller 200 includes CPU 202 that is coupled over one or more buses 212 to current sense detector 222, fault detector 224, protection logic 226, one or more programmable threshold detectors 228-1 and 228-2, and discharge logic 232. CPU 202 is configured to execute firmware and/or software instructions which may be stored in non-volatile memory and which, when executed, re-configure and/or re-program current sense detector 222, fault detector 224, protection logic 226, threshold detectors 228-1 and 228-2, and programmable discharge logic 232 in accordance with the techniques described herein. In various implementations and embodiments, the configuration data accessed/used by the firmware instructions may be stored in any suitable volatile and/or non-volatile storage that may include, but is not limited to, an array of storage elements, a re-programmable flash memory, re-programmable or one-time programmable (OTP) registers, a RAM array, and an array of data flops. In some embodiments the firmware instructions and its data may be stored on-chip, while in other embodiments some (or all) of the firmware instructions and its data may be stored in an external memory (e.g., serial EEPROM) and may be executed-in-place or may be read and loaded into the volatile memory of IC controller 200 prior to execution or at certain operational events (e.g., at power on or reset).

It should be understood that various embodiments may provide various mechanisms to facilitate the re-configurabilty and/or re-programmability of an IC controller (and of its various components) that operates in accordance with the techniques for VBUS voltage discharge described herein. For example, some embodiments may store configuration and/or program data in logic circuits that are enabled/disabled by using resistor-based fuses that are trimmed when the IC controller is manufactured. Examples of such fuses include laser fuses, e-fuses, and non-volatile latches that have some characteristics of fuses and some characteristics of non-volatile memory. In some embodiments, pin-strapping may be used to facilitate the programmability of the IC controller. A pin-strapping mechanism may involve connecting (e.g., via jumpers or PCB traces) a number of controller pins/terminals to power or ground to have each input provide a binary value to the IC controller, where the collection of the provided input values is used configuration data to configure or program one or more components of the controller. In some embodiments, the configuration data for programming the IC controller may be stored as a resistor configuration storage. For example, a set of resistors may be connected between a set of pins/terminals of the IC controller and power or ground, to create a voltage or current that can be measured by an ADC to produce a binary value to configure one or more parameters of the controller. In other embodiments, the configuration data for programming the IC controller may be provided as a mask ROM or a metal mask. For example, a chip manufacturer can customize a particular batch of IC controller chips by changing the connections of pre-defined internal nodes between a "1" and a "0" using a single lithographic mask that is specific to that custom configuration with other masks remaining unchanged between batches, thereby providing custom configuration parameters for the particular batch of controllers.

It should be understood that various embodiments may provide various types of programmability for an IC controller (and of its components) that operates in accordance with the techniques for VBUS voltage discharge described herein. For example, some embodiments (such as the embodiment illustrated in FIG. 2) may provide dynamic programmability, in which configuration changes are re-programmed in the course of normal operation of the IC controller, usually (but not necessarily always) in response to a change in one or more operating conditions or an external command and based on data previously programmed into the controller. Other embodiments may use in-system programmability, in which configuration changes are re-programmed in the course of normal operation of the IC controller in response to an external command and based on new configuration data downloaded into the controller in association of the command. In some embodiments, the IC controller may be factory-programmed as part of its manufacture or as part of the manufacture of an end product (e.g., such as a power adapter, a wall socket, a car charger, a power bank, etc.). For example, the IC controller may be programmed during manufacture by using various mechanisms such as firmware instructions stored in non-volatile memory, pin-strapping, resistor programming, laser-trimmed fuses, NV latches, or OTP registers.

In the embodiment of FIG. 2, current sense detector 222 is coupled to CPU 202 over bus(es) 212 and to an output pin (not shown) of IC controller 200 that is connected to a USB ground line. Current sense detector 222 includes over-current protection logic that senses the current delivered through VBUS line 201 or returned through the USB ground line during operation, and applies a control signal to fault detector 224 when the sensed current is above a configured threshold. CPU 202 can re-program or select one or more configuration parameters (e.g., such as the current detection thresholds) of current sense detector 222 during the operation of IC controller 200. For example, CPU 202 may execute firmware instructions, in response to changes in one or more operating conditions or commands and based on external and/or on previously-programmed data.

Fault detector 224 includes fault detection logic and is coupled to CPU 202 over bus(es) 212. Fault detector 224 is configured to receive data and/or control signals from current sense detector 222, protection logic 226, and voltage threshold detectors 228-1/228-2, and is also coupled to provide data and/or control signal(s) to discharge control logic 232. In response to firmware instructions executed by CPU 202 and/or based on the received signals, fault detector 224 determines whether fault conditions have occurred on VBUS line 201 (or elsewhere in IC controller 200) and provides the appropriate data/control signal(s) to discharge control logic 232. During the operation of IC controller 200, CPU 202 can re-program one or more configuration parameters of fault detector 224, e.g., by executing firmware instructions in response to changes in operating conditions or commands and based on external and/or on previously-programmed data. Examples of fault conditions on VBUS line 201 that fault detector 224 can detect include, without limitations, an over-current condition, a short circuit condition, over-voltage condition, reverse current condition, and others. Fault detector 224 can also detect a VBUS swap event on VBUS line 201.

VBUS swap, which is referred to as Fast Role Swap (FRS) in the USB-PD specification, is a mechanism that allows for interchanging the roles of a power source and power sink in a USB-PD system. For example, the same Type-C port in an electronic device (e.g., such as a power bank) can be a power sink when connected to a provider device, or a power source when connected to a consumer device. Under the FRS defined in the USB-PD specification, these roles of the Type-C port can be dynamically (e.g., without unplugging) switched under certain conditions without loss of power by the attached devices. That is, an FRS-compliant port must be able to switch from sinking power to sourcing power quickly enough (i.e., in under 150 $\mu$s) to avoid any interruption of power. According to the techniques described herein, fault detector 224 is also configured to detect a VBUS swap event on VBUS line 201 and to provide a corresponding trigger signal to protection logic 226, in order to meet the FRS requirements of the USB-PD specification.

Protection logic 226 is coupled to CPU 202 over bus(es) 212 and to discharge control logic 232. Protection logic 226 includes hardware circuitry to receive control signals indicating fault conditions detected by fault detection logic 224, and to provide corresponding interrupt signals to CPU 202. Protection logic 226 also includes a counter and a programmable threshold detector configured to continuously monitor the actual rate of voltage discharge from VBUS 201 that is bring enabled by discharge control logic 232. When the programmed threshold is met or when the actual discharge rate differs substantially from the predicted/expected rate, protection logic 226 provides an appropriate control signal to discharge control logic 232 to stop the discharge. This allows discharge control logic 232 to keep the VBUS voltage discharge on until the programmed threshold is met, all the while the rate of voltage discharge is being monitored and compared to the expected rate for the given discharge profile or state. During the operation of IC controller 200, the counter and threshold parameters of protection logic 226 can be re-programmed by CPU 202, e.g., by executing appropriate firmware instructions.

Voltage threshold detector 228-1 is coupled to input pin 215 and to discharge circuit 230-1, and is configured to monitor the voltage on power source node 205 of VBUS line 201. Voltage threshold detector 228-2 is coupled to input pin 217 and to discharge circuit 230-2, and is configured to monitor the voltage on output node 207 of VBUS 201. Each voltage threshold detector 228-1/228-2 is also coupled to CPU 202 over bus(es) 212. In this manner, the embodiment in FIG. 2 provides separate voltage threshold detectors for the power source node and the output node of VBUS line 201. It should be understood, however, that in some embodiments the same voltage threshold detector block may be configured to monitor both the power source voltage and the output voltage on the VBUS line. Thus, the embodiment of FIG. 2 illustrating two separate voltage threshold detectors should be regarded in an illustrative rather than a restrictive sense.

Voltage threshold detectors 228-1 and 228-2 include logic to respectively monitor the voltage levels of VBUS line 201 on either side of power switch 203, and to provide data and/or control signal(s) to fault detector 224 and to discharge control logic 232. The logic in each voltage threshold detector 228-1/228-2 includes a resistor divider and a voltage reference generator that are coupled through appropriate connection circuitry (e.g., buses, MUXes) to a set of comparators. The resistor divider provides multiple tap points to scale down the voltage detected on VBUS line 201. The scaled voltage output from a tap point (e.g., 10%, 20%, etc.) is compared by a comparator to a reference voltage generated by the reference voltage generator. When the scaled voltage reaches the reference voltage of the comparator, the comparator trips and generates an output signal indicating that the voltage measured at the corresponding node on VBUS line 201 has reached the voltage level represented by the reference voltage signal. The output signal is provided to fault detector 224, which in turn generates an interrupt on bus 212 to indicate a detected voltage level (or change thereof) to CPU 202. In this manner, each of voltage threshold detectors 228-1/228-2 can monitor the voltage level at its corresponding node of VBUS line 201, and can detect a VBUS voltage with respect to multiple voltage levels.

During the operation of IC controller 200, CPU 202 can re-program the reference threshold voltages, the connectivity routing to various tap points, and other configuration parameters of each voltage threshold detector 228-1 and 228-2 separately and independently of the other. For example, by executing appropriate firmware instructions, CPU 202 can reduce or increase the threshold voltage levels monitored by voltage threshold detector 228-1 separately from the voltage thresholds being monitored by voltage threshold detector 228-2. Such programmable threshold control provides for avoiding the loss of power to IC controller 200, e.g., in applications where the controller is powered only from the power source side of VBUS line 201. Further, the separate and independent programmable control for voltage threshold detectors 228-1 and 228-2 allows IC controller 200 to implement a PD contract (or portion thereof) that requires any negative voltage transition on VBUS line 201 within the time limits required by the USB-PD specification.

Within IC controller 200, discharge circuit 230-1 is coupled between input pin 215 and ground output pin 211 to drive current from power source node 205 of VBUS line 201 to ground, thereby reducing the VBUS voltage at the power source node. Similarly, discharge circuit 230-2 is coupled between input pin 217 and ground output pin 211 to drive current from output node 207 of VBUS line 201 to ground, thereby reducing the VBUS voltage at the output node. It is noted that the embodiment in FIG. 2 provides a single ground output pin 211 for current discharged by both discharge circuits 230-1 and 230-2. It should be understood, however, that in some embodiments each discharge circuit can be coupled to its own ground output pin of the IC controller, while in other embodiments any discharge circuit can be coupled to multiple ground output pins of the controller. Thus the embodiment of FIG. 2, which illustrates a single ground output pin for both discharge circuits, should be regarded in an illustrative rather than a restrictive sense.

Discharge circuits 230-1 and 230-2 are configured to reduce the voltage on VBUS line 201 by driving current from the VBUS line through IC controller 200 to a USB ground/return line (and/or to another system ground). Discharge control logic 232 is configured to control the operation of each discharge circuit 230-1 and 230-2 separately and independently of the other. For example, discharge control logic 232 can apply control signals to enable and disable discharge circuit 230-1 separately and independently of the control signals it applies to discharge circuit 230-2, where the control signals regulate the timing, duration, and amount of the current conducted by each discharge circuit through IC controller 200.

Figure 3:
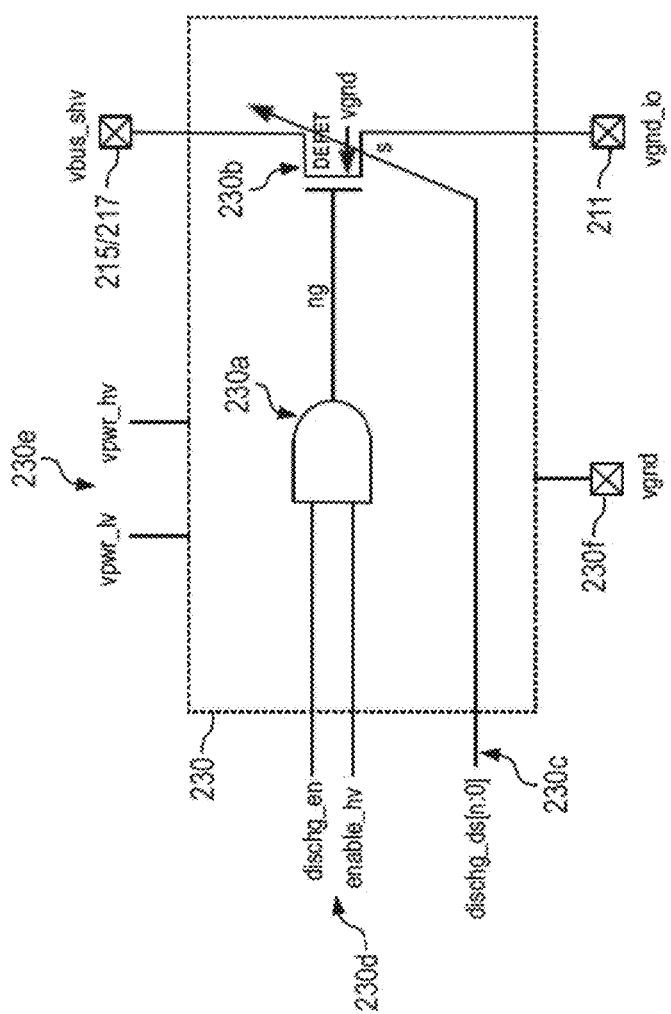
FIG. 3 illustrates an example discharge circuit according to some embodiments.

FIG. 3 illustrates an example discharge circuit 230 in accordance with the techniques for VBUS voltage discharge described herein. Similarly to discharge circuits 230-1/230-2 of FIG. 2, discharge circuit 230 in FIG. 3 is configured to drive current from a node of a VBUS line to ground. Discharge circuit 230 is disposed on the semiconductor die of an IC controller (e.g., such as IC controller 200 of FIG. 2), and is coupled between an input pin 215 or 217 and a ground output pin 211 of the controller. The input pin 215/217 of the IC controller is configured to receive a high-voltage VBUS signal ("vbus_shv") from a node of a VBUS line, and the ground output pin 211 is configured provide a return signal ("vgnd_io") to a USB GND line (or to other system ground).

Discharge circuit 230 includes logic gate 230*a* coupled to transistor device 230*b*, and is configured to receive a multi-bit control signal 230*c* ("dischg_ds[n:0]"), enable signals 230*d* (discharge enable signal "dischg_en" and high-voltage enable signal "enable_hv"), and power supply signals 230*e* (low-voltage signal "vpwr_lv" and high-voltage signal "vpwr_hv"). Discharge circuit 230 is coupled to its own ground pin 230*f* to ensure its electronic elements are not affected by a ground bounce from ground output pin 211. Logic gate 230*a* is configured to receive as input the enable signals 230*d* from a discharge control logic and to generate as output a high-voltage N-gate enable signal ("ng") that is applied to the gates of transistor device 230*b*. Transistor device 230*b* is constructed of a multiple, independently-controlled groups of DEFET transistors, the groups of DEFETs being coupled in parallel with each other between input pin 215/217 and ground output pin 211. The gates of each group of DEFETs are coupled to receive the high-voltage N-gate enable signal from logic gate 230*a*, and each DEFET transistor is configured to withstand a high voltage (e.g., ~30V) between its drain and its source. Metal routes with suitable resistivity characteristics are used on-die between transistor device 230*b* and pins 215/217 and 211 in order to avoid or at least minimize the risk of heating or fusing. For example, in some embodiments such metal routes may be constructed to withstand a maximum current of 880 mA (22V/25Ω), which is well above the maximum expected to be conducted by discharge circuit 230 under the USB-PD current discharge requirements.

Multi-bit control signal 230*c* is provided by a discharge control logic (e.g., such as discharge control logic 232 in FIG. 2) and is configured to control the amount of current driven through transistor device 230*b* at a programmable drive-strength. For example, if the current that can be driven between the drain and the source of one DEFET transistor is denoted as "X", then a group with one DEFET would have a drive-strength of 1X, a group with two DEFETs would have a drive-strength of 2X, a group with four DEFETs would have a drive-strength of 4X, etc. Thus, a digital word represented as a multi-bit signal can be used to control the amount of discharged current by using the correct combination of "1s" and "0s" to turn on/off the corresponding groups of DEFET transistors. In an example embodiment, transistor device 230*b* includes six groups of DEFETs configured for drive-strengths of 1X, 2X, 4X, 8X, 16X, and 32X. Each group of DEFETs is independently controlled by one bit of a 6-bit control signal 230*c*, which allows the discharge control logic to control the drive-strength of transistor device 230*b* at any level between 1X and 63X. During operation, the discharge control logic uses the bits of the 6-bit control signal to turn on the groups of DEFETs in steps in order to ensure that the current driven through transistor device 230*b* is increased gradually so not to produce a ground bounce at ground output pin 211. The timing of such drive-strength scheduling can be based on the operational characteristics of the IC controller and can be programmable based on the particular USB-PD application.

Referring back to FIG. 2, discharge control logic 232 is coupled to CPU 202 over bus(es) 212. Discharge control logic 232 is configured to receive data and/or control signals from protection logic 226 and from voltage threshold detectors 228-1/228-2, and is also coupled to provide control signals to discharge circuits 230-1 and 230-2. In response to firmware instructions executed by CPU 202 and/or based on the received signals, discharge control logic 232 can control discharge circuits 230-1 and 230-2 independently of each other and can cause each discharge circuit to discharge voltage from its corresponding node on VBUS line 201 at a programmable discharge rate. During the operation of IC controller 200, CPU 202 can re-program the timing, duration, drive-strength and other configuration parameters of discharge control logic 232, e.g., by executing firmware instructions in response to changes in operating conditions or commands and based on external and/or on previously-programmed data.

Discharge control logic 232 is configured to drive discharge circuits 230-1 and 230-2 independently of each other, which eliminates the need for external (off-chip) current-limiting high-wattage resistors. Further, discharge control circuit 232 is configured to stop discharging current through the discharge circuits in response to firmware instructions or to signals from voltage threshold detector(s) 228-1/228-2. For example, discharge control logic 232 can stop discharging when the voltage on VBUS line 201 reaches a certain non-zero voltage level (e.g., 12V, 9V, 6V, etc). The non-zero voltage level can be programmable through the configuration parameters of the voltage threshold detector(s) 228-1/228-2 or can be based on detecting that a VBUS voltage has crossed a corresponding threshold. This allows discharge control logic 232 to control the rate of VBUS voltage discharge from either of nodes 205 and 207 of VBUS line 201.

In some embodiments, discharge control logic 232 may also be configured to automatically turn off discharge circuit(s) 230-1/230/2, e.g., in response to a signal from protection logic 226. For example, this auto turn-off function may be activated when the voltage on VBUS line 201 is detected to reach below 5.5V in order to ensure that the VBUS voltage never drops below the 5V USB default. In turn, this ensures that any system components that are powered off VBUS line 201 would not lose power.

In some embodiments, discharge control logic 232 may also be configured to protect IC controller 200 from discharging a live supply from VBUS line 201. For example, when the VBUS voltage at power source node 205 is not going down despite discharge circuit 230-1 being turned on for a certain period of time, this may indicate that a live supply current is being discharged through IC controller 200. In response to detecting this condition (e.g., by using an output signal from a programmable counter), voltage threshold detector 228-1 generates a corresponding signal to discharge control logic 232, and the discharge control logic shuts down discharge circuit(s) 230-1 and/or 230-2 to protect IC controller 200.

In some embodiments, discharge control logic 232 may also be configured to discharge the voltages on VBUS nodes 205 and 207 at the same or at different rates. The discharge rates can be re-programmed dynamically based on an external command received by IC controller 200 and/or based on changes in operating conditions (e.g., as detected based on signals from the other components of the controller). For example, discharge control logic 232 can generate and apply a separate pulse-width modulation (PWM) enable signal (e.g., such as "dischg_en" signal 230*d* in FIG. 3) to each discharge circuit 230-1 and 230-2. This allows each discharge circuit to be turned on and off at its own timing, thereby allowing for independent control of its discharge rate.

In some embodiments, discharge control logic 232 can also control the discharge rate of each discharge circuit 230-1/230-2 through a programmable drive-strength schedule. For example, during operation discharge control logic 232 can generate and apply a separate multi-bit control signal (e.g., such as signal 230*c* in FIG. 3) to each discharge circuit 230-1 and 230-2. This allows each discharge circuit to be driven at its own drive-strength, thereby allowing for independent control of its discharge rate. In some embodiments, the multi-bit control signal of each discharge circuit 230-1/230-2 can be used for step-wise turn on. For example, discharge control logic 232 can start by gradually increasing the drive-strength for certain period of time (e.g., 10 ms), then hold the current discharge level for a certain period of time (e.g., 20 ms), and thereafter continue to gradually increase driving the current through the discharge circuit until it reaches the desired discharge level. The drive-strength increases can be done one step at a time with a minimum of 1 ms between steps. This mechanism allows discharge control logic 232 to prevent a ground bounce at ground output pin 211. A ground bounce is a condition when the ground voltage is suddenly raised above substantially 0V. Such condition may occur when a large amount of current is pulled down through the ground pin of a chip (e.g., when a discharge circuit is instantly turned on at its full drive-strength).

Discharge control logic 232 can drive either or both of discharge circuits 230-1/230-2 in response to firmware instructions that reflect the drive-strength schedule of each discharge circuit. In some embodiments and implementations, discharge control logic 232 can use the same drive-strength schedule in all cases and/or for both discharge circuits. This mechanism may be useful when longer time delays and high current flow at high VBUS voltage levels can be tolerated. In other embodiments and implementations, discharge control logic 232 can use a drive-strength schedule that is scaled for a pre-defined use condition. This mechanism may be useful when the initial VBUS voltage and the capacitance load on VBUS line 201 are known. In yet other embodiments and implementations, discharge control logic 232 can use a drive-strength schedule that uses conditional updates that are based on the VBUS voltage. For example, the presently-determined VBUS voltage level may be used as a look-up value against data stored in flash memory to determine what (if any) drive-strength to use. This mechanism does not require any knowledge of the capacitance load on VBUS line 201 and automatically reacts to the VBUS voltage level.

In some embodiments, a discharge control logic can control discharge circuits in an IC controller without using programmable firmware or re-configurable hardware. For example, a logic engine can be designed (e.g., as a synthesizable RTL) with schedulers, counters, and other fixed hardware elements that are configured to activate the discharge circuits at a fixed timing schedule. The discharge control logic can also use fixed current-discharge profiles and multiple, preset drive-strength schedules that are hard-wired to provide support for a limited number of operating conditions or scenarios.

Figure 4:
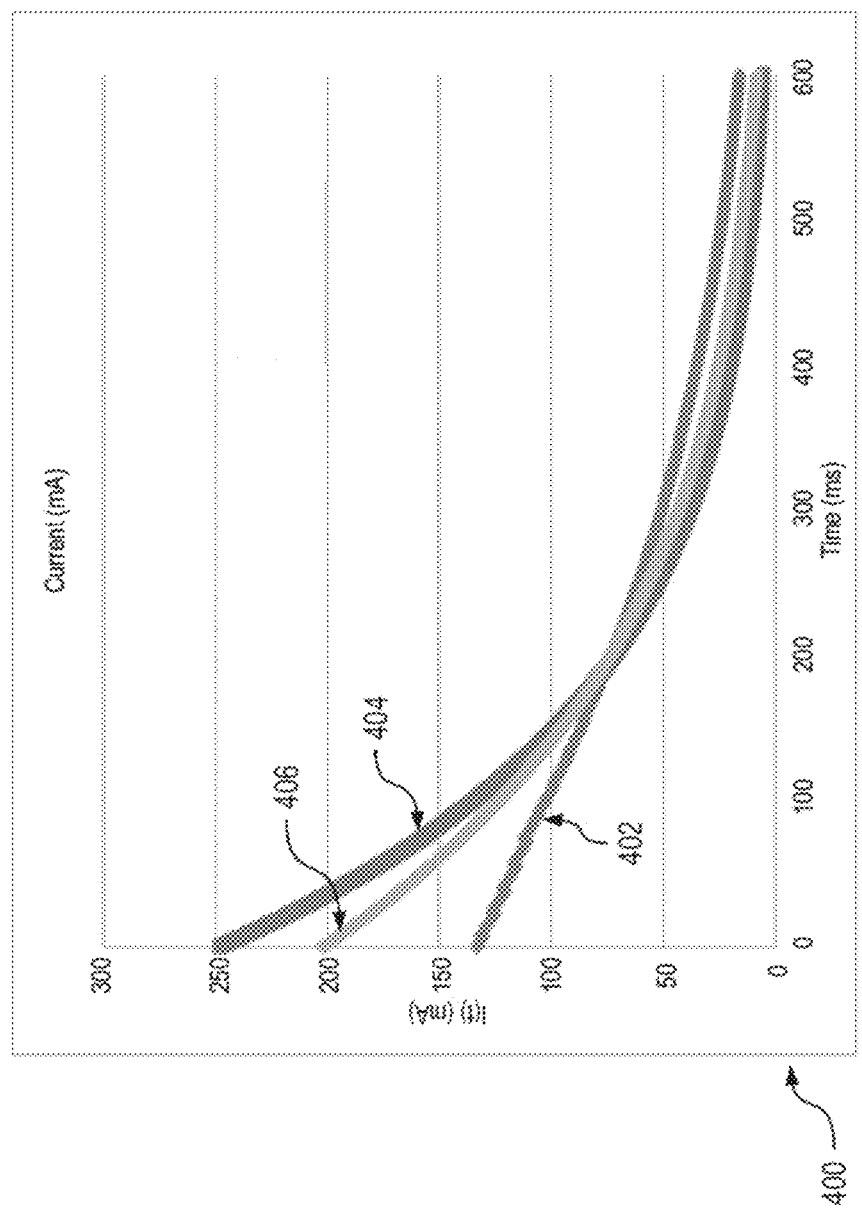
FIG. 4 illustrates a diagram of current discharge from a USB VBUS line without drive-strength scheduling, according to an example embodiment.

FIG. 4 illustrates diagram 400 of current discharge from a VBUS line in an operational context without drive-strength scheduling, e.g., when a discharge circuit of an IC controller is turned on at at full drive-strength. The rate of current flow with time I(t) through the discharge circuit is plotted over time for the same IC controller chip under different resistance conditions. A resistance condition reflects the operating parameters of the discharge circuit (e.g., such as temperature and VBUS voltage) and characterizes its discharging capability. For example, plot line 402 illustrates a discharge current during a relatively high resistance condition (e.g., at a higher operating temperature and/or VBUS voltage). As illustrated by plot line 402, the current discharged during high resistance conditions can reach about 130 mA without use of drive-strength scheduling. Plot line 404 illustrates a discharge current during a relatively low resistance condition (e.g., at a lower operating temperature and/or VBUS voltage). As illustrated by plot line 404, the current discharged during low resistance conditions can reach about 250 mA without use of drive-strength scheduling. Plot line 406 illustrates a discharge current during a typical resistance condition (e.g., at a normal/room operating temperature and/or a typical VBUS voltage). As illustrated by plot line 406, the current discharged during typical resistance conditions can reach about 200 mA without use of drive-strength scheduling.

Figure 5:
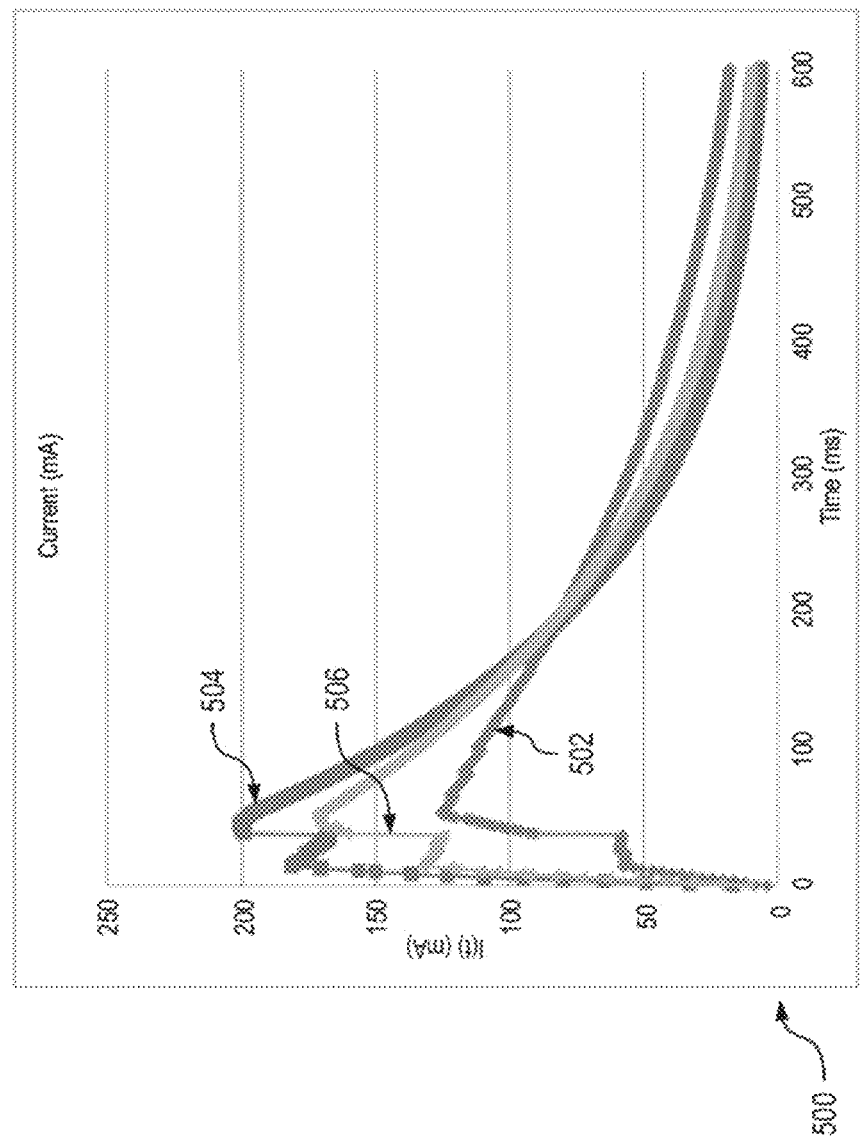
FIG. 5 illustrates a diagram of current discharge from a USB VBUS line with programmable drive-strength scheduling, according to an example embodiment.

FIG. 5 illustrates diagram 500 of current discharge from a VBUS line in an operational context that uses drive-strength scheduling, e.g., when a discharge control logic uses a programmable drive-strength schedule as described herein. The rate of current flow with time I(t) through the discharge circuit is plotted over time for the same IC controller chip under high, low and typical resistance conditions. For each resistance condition, diagram 500 illustrates an initial step-wise increase of current driven through the discharge circuit, followed by a hold period during which the discharge level is not increased, and then followed by another step-wise increase in the current being driven.

For example, plot line 502 illustrates a discharge current during a relatively high resistance condition. As illustrated by plot line 502, the current discharged during high resistance conditions peaks about 125 mA, which is less compared to the 130 mA under high resistance conditions without use of drive-strength scheduling (e.g., as illustrated by plot line 402 in FIG. 4). Plot line 504 illustrates a discharge current during a relatively low resistance condition. As illustrated by plot line 504, the current discharged during low resistance conditions peaks about 200 mA, which is less compared to the 250 mA under low resistance conditions without use of drive-strength scheduling (e.g., as illustrated by plot line 404 in FIG. 4). Plot line 506 illustrates a discharge current during a typical resistance condition. As illustrated by plot line 506, the current discharged during typical resistance conditions peaks about 175 mA, which less compared to the 200 mA under typical resistance conditions without use of drive-strength scheduling (e.g., as illustrated by plot line 406 in FIG. 4). Overall, FIG. 5 illustrates that use of a programmable drive-strength schedule as described herein can lower the peak magnitude of the discharged current when compared to drive schemes that do not use drive-strength scheduling.

The techniques for VBUS voltage discharge described herein may be embodied in several different types of USB-PD applications. One example is a sourcing application, in which a power source is configured as a provider device to provide power through a USB Type-C port to a consumer device. Another example is a Dual-Role-Power (DRP) application, in which a USB Type-C port is configured to operate as either a power source or a power sink or can alternate between these two roles dynamically by using USB-PD power role swap.

Figure 6:
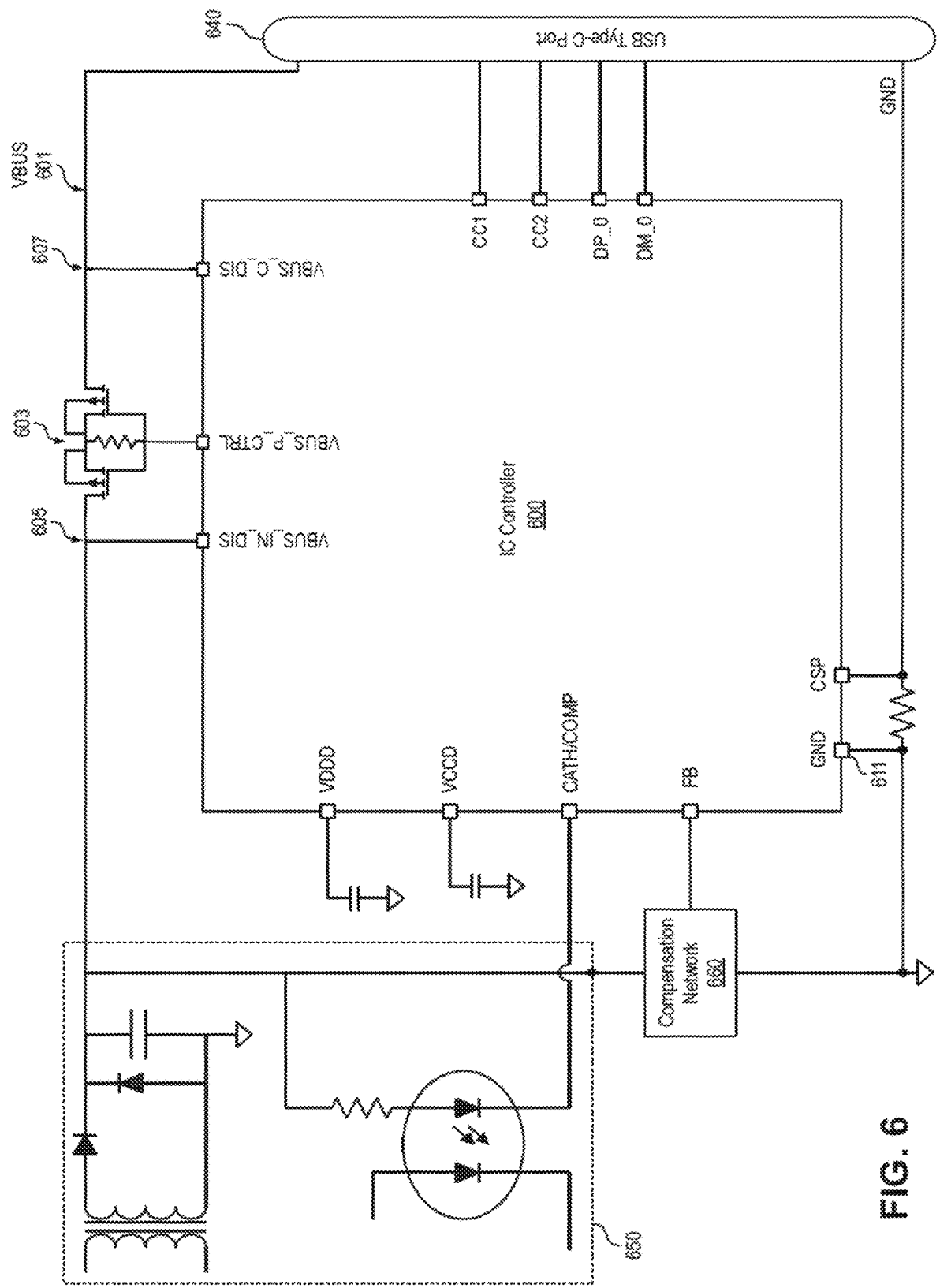
FIG. 6 illustrates a schematic diagram of a personal computer (PC) USB-PD power adapter, according to an example embodiment.

FIG. 6 illustrates a PC USB-PD power adapter with opto-isolator feedback, according to an example embodiment. IC controller 600 may be disposed in a chip package and includes a USB-PD subsystem configured in accordance with the techniques for VBUS voltage discharge described herein. IC controller 600 is configured to negotiate a PD contract with a consumer device (not shown) attached to USB Type-C port 640 and to control through an output pin ("CATH/COMP") the required VBUS voltage that is output from power converter 650. USB Type-C port 640 is typically associated with a Type-C plug, but it should be understood that in various embodiments the USB Type-C port may be associated with a Type-C receptacle instead. Power converter 650 is an AC power source and is coupled to compensation network 660, which is a resistor-capacitor (RC) circuit specific to the design of the power converter and is coupled to receive a feedback signal from an output pin ("FB") of IC controller 600.

IC controller 600 is coupled to VBUS line 601 and is configured to control the discharge of VBUS voltage during negative voltage transitions thereon. VBUS line 601 includes power switch 603 that is configured as an on/off switch device controlled by signals from an output pin ("VBUS_P_CTRL") of a gate driver in IC controller 600. On one side of power switch 603, a power source node 605 on the VBUS line is coupled to power converter 650, which includes a large bulk capacitor configured to remove the AC component of the power signal. Power source node 605 is coupled to an input pin ("VBUS_IN_DIS") of IC controller 600. The "VBUS_IN_DIS" pin is coupled to an on-die discharge circuit that is configured to pull down current from power source node 605, thereby reducing its VBUS voltage. On the other side of power switch 603, an output node 607 on the VBUS line is coupled to USB Type-C port 640. Output node 607 is coupled to another input pin ("VBUS_C_DIS") of IC controller 600. The "VBUS_C_DIS" pin is coupled to another on-die discharge circuit that is configured to pull down current from output node 607, thereby reducing its VBUS voltage. The current pulled down through the on-die discharge circuits of IC controller 600 is driven to output pin ("GND") 611 of IC controller 600. Ground pin 611 is coupled to the ground GND line of USB Type-C port 640. Discharge control logic in IC controller 600 is configured to control the operation of each discharge circuit separately and independently of the other by use of enable and control signals that regulate the timing, duration, and amount of the current conducted by each discharge circuit through the IC controller.

In operation, the direction of power flow on VBUS line 601 is from power converter 650 to a consumer device, such as a laptop computer (not shown), that is attached to USB Type-C port 640. When a PD contract with the consumer device is negotiated, IC controller 600 turns on power switch 603 to provide power to the consumer device at the negotiated voltage and/or current level(s). A negative voltage transition on VBUS line 601 may be needed when the PD contract is dynamically re-negotiated to lower the VBUS voltage and/or current, e.g., when the consumer device has finished charging its battery and now needs power only to operate. In response, discharge control logic in IC controller 600 turns on the on-die discharge circuit(s) to reduce the VBUS voltage at nodes 605 and/or 607, in accordance with the techniques described herein. The discharge control logic turns off the discharge circuits and stops discharging when the voltage on VBUS line 601 reaches the lower voltage level required by the new PD contract.

Figure 7:
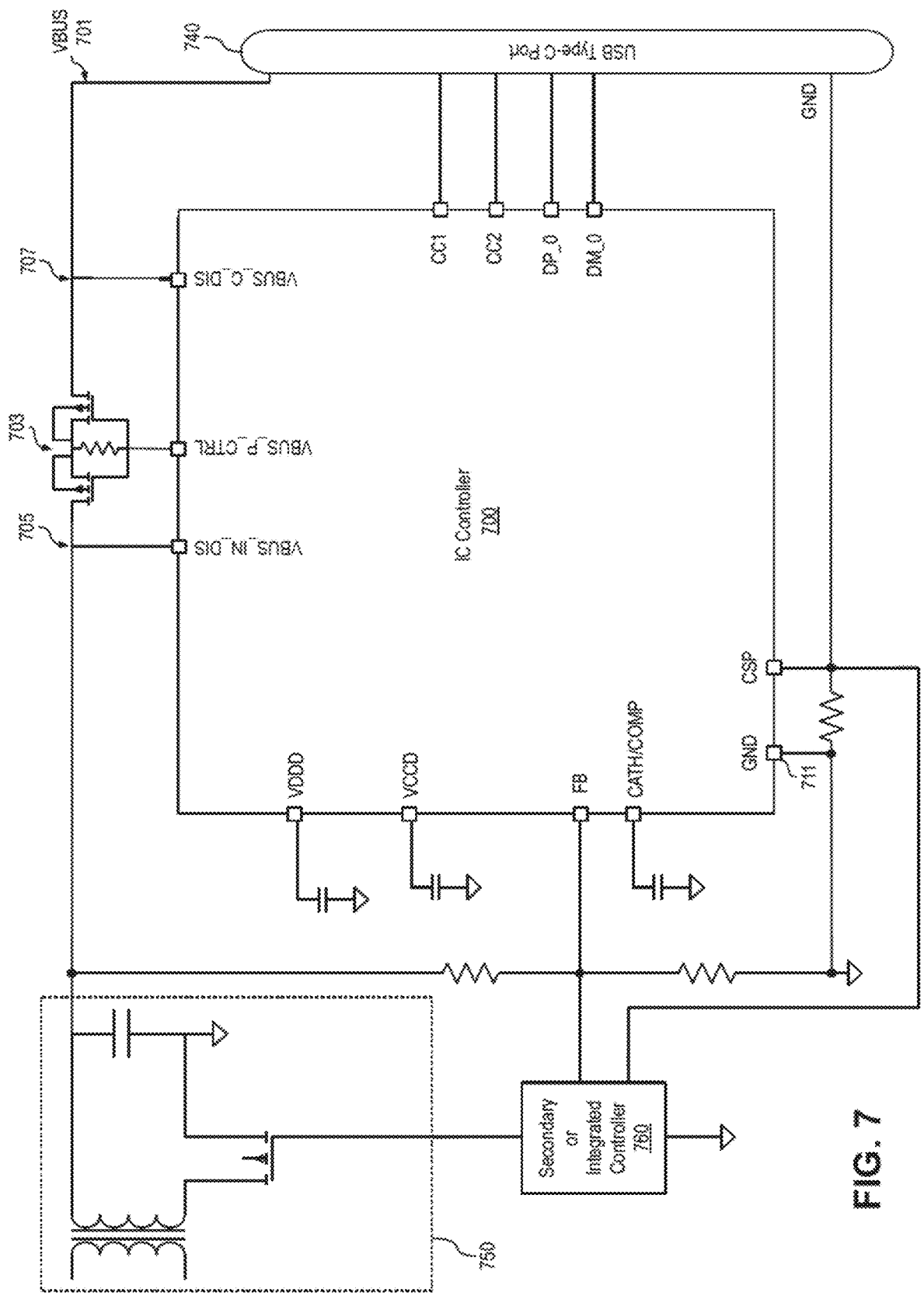
FIG. 7 illustrates a schematic diagram of a mobile phone USB-PD power adapter, according to an example embodiment.

FIG. 7 illustrates a USB-PD power adapter according to various embodiments (e.g., such as a wall adapter for a mobile phone, or a wall socket). IC controller 700 may be disposed in a chip package and includes a USB-PD subsystem configured in accordance with the techniques for VBUS voltage discharge described herein. IC controller 700 is configured to negotiate a PD contract with a consumer device (not shown) attached to USB Type-C port 740. In various embodiments, USB Type-C port 740 can be associated with a Type-C plug or a Type-C receptacle. Power converter 750 is an AC power source and includes a large bulk capacitor configured to remove the AC component of the power signal provided onto VBUS line 701. Power converter 750 is coupled to controller 760, which is configured to control the voltage provided by the power converter based on a feedback signal from an output pin ("FB") of IC controller 700. IC controller 700 supports two modes of operation, constant voltage mode and constant current mode (also referred to as direct charging mode). Upon appropriate negotiation with a consumer device over USB Type-C port 740, IC controller 700 switches between its two modes of operation and provides the appropriate feedback signal on its output pin "FB" to control the operation of controller 760.

IC controller 700 is coupled to VBUS line 701 and is configured to control the discharge of VBUS voltage during negative voltage transitions thereon. VBUS line 701 includes power switch 703 that is configured as an on/off switch device controlled by signals from an output pin ("VBUS_P_CTRL") of a gate driver in IC controller 700. On one side of power switch 703, a power source node 705 on the VBUS line is coupled to power converter 750. Power source node 705 is coupled to an input pin ("VBUS_IN_DIS") of IC controller 700. The "VBUS_IN_DIS" pin is coupled to an on-die discharge circuit that is configured to pull down current from power source node 705, thereby reducing its VBUS voltage. On the other side of power switch 703, an output node 707 on the VBUS line is coupled to USB Type-C port 740. Output node 707 is coupled to another input pin ("VBUS_C_DIS") of IC controller 700. The "VBUS_C_DIS" pin is coupled to another on-die discharge circuit that is configured to pull down current from output node 707, thereby reducing its VBUS voltage. The current pulled down through the on-die discharge circuits of IC controller 700 is driven to output pin ("GND") 711 of IC controller 700. Ground pin 711 is coupled the ground GND line of USB Type-C port 740. Discharge control logic in IC controller 700 is configured to control the operation of each discharge circuit separately and independently of the other by use of enable and control signals that regulate the timing, duration, and amount of the current conducted by each discharge circuit through the IC controller.

In operation, the direction of power flow on VBUS line 701 is from power converter 750 to a consumer device, such as a mobile phone (not shown), that is attached to USB Type-C port 740. When a PD contract with the consumer device is negotiated, IC controller 700 turns on power switch 703 to provide power to the consumer device at the negotiated voltage and/or current level(s). A negative voltage transition on VBUS line 701 may be needed when the PD contract is dynamically re-negotiated to lower the VBUS voltage and/or current, e.g., when the consumer device has finished charging its battery. In response, discharge control logic in IC controller 700 turns on the on-die discharge circuit(s) to reduce the VBUS voltage at nodes 705 and/or 707, in accordance with the techniques described herein. The discharge control logic turns off the discharge circuits and stops discharging when the voltage on VBUS line 701 reaches the lower voltage level required by the new PD contract.

Figure 8:
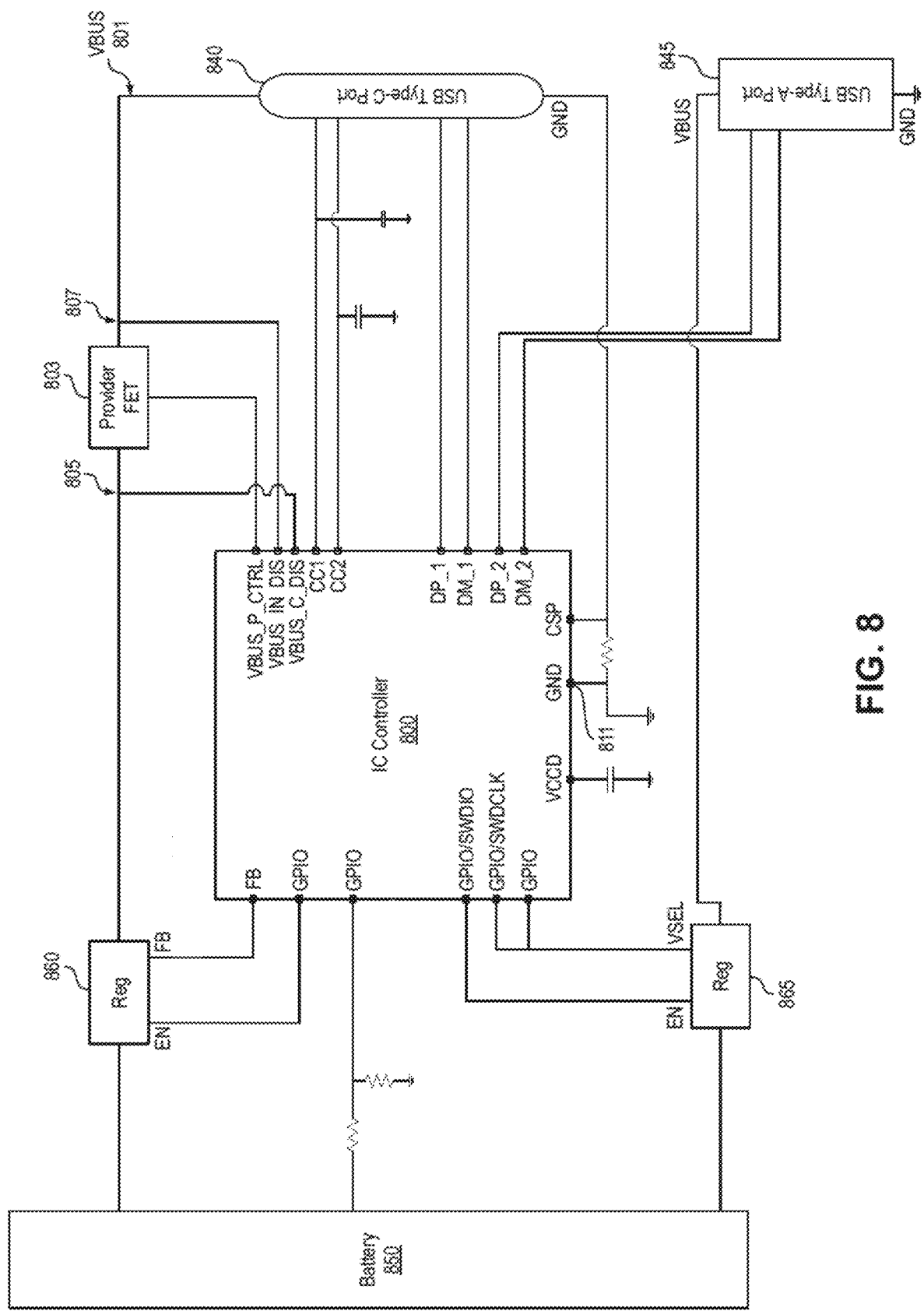
FIG. 8 illustrates a schematic diagram of a USB-PD car charger, according to an example embodiment.

FIG. 8 illustrates an example two-port USB Type-A/Type-C car charger, according to an example embodiment. IC controller 800 may be disposed in a chip package and includes a USB-PD subsystem configured in accordance with the techniques for VBUS voltage discharge described herein. IC controller 800 is configured to negotiate a PD contract with a consumer device (not shown) attached to USB Type-C port 840. USB Type-C port 840 is typically associated with a Type-C receptacle, but it should be understood that in various embodiments the USB Type-C port may be associated with a Type-C plug instead. Battery 850 is a DC power source, e.g., such as a car battery. Battery 850 is coupled to regulator 860, which is configured to control the voltage provided by the battery on VBUS line 801 based on enable and feedback signals from output pins of IC controller 800. Battery 850 is also coupled to regulator 865, which is configured to control the voltage provided by the battery on a VBUS line to USB Type-A port 845. Regulator 865 is controlled based on enable and voltage-select signals from output pins of IC controller 800, to provide VBUS voltages and currents in accordance with older USB specifications (e.g., such as the USB 2.0 Specification, the USB Battery Charging Specification Rev. 1.1/1.2, etc.) to charge USB-enabled devices through the USB Type-A port. In some embodiments, IC controller 800 may be configured with a charge-detect block for USB Type-A port 845 and may provide an option to enable or disable the USB Type-A charging.

IC controller 800 is coupled to VBUS line 801 and is configured to control the discharge of VBUS voltage during negative voltage transitions thereon. VBUS line 801 includes power switch 803 that is configured as an on/off switch device controlled by signals from an output pin ("VBUS_P_CTRL") of a gate driver in IC controller 800. On one side of power switch 803, a power source node 805 on the VBUS line is coupled to battery 850. Power source node 805 is coupled to an input pin ("VBUS_C_DIS") of IC controller 800. The "VBUS_C_DIS" pin is coupled to an on-die discharge circuit that is configured to pull down current from power source node 805, thereby reducing its VBUS voltage. On the other side of power switch 803, an output node 807 on the VBUS line is coupled to USB Type-C port 840. Output node 807 is coupled to another input pin ("VBUS_IN_DIS") of IC controller 800. The "VBUS_IN_DIS" pin is coupled to another on-die discharge circuit that is configured to pull down current from output node 807, thereby reducing its VBUS voltage. The current pulled down through the on-die discharge circuits of IC controller 800 is driven to output pin ("GND") 811 of IC controller 800. Ground pin 811 is coupled to the ground GND line of USB Type-C port 840. Discharge control logic in IC controller 800 is configured to control the operation of each discharge circuit separately and independently of the other by use of enable and control signals that regulate the timing, duration, and amount of the current conducted by each discharge circuit through the IC controller.

In operation, the direction of power flow on VBUS line 801 is from battery 850 to a consumer device, such as a mobile phone (not shown), that is attached to USB Type-C port 840. When a PD contract with the consumer device is negotiated, IC controller 800 turns on power switch 803 to provide power to the consumer device at the negotiated voltage and/or current level(s). A negative voltage transition on VBUS line 801 may be needed when the PD contract is dynamically re-negotiated to lower the VBUS voltage and/or current, e.g., when the consumer device has finished charging its battery. In response, discharge control logic in IC controller 800 turns on the on-die discharge circuit(s) to reduce the VBUS voltage at nodes 805 and/or 807, in accordance with the techniques described herein. The discharge control logic turns off the discharge circuits and stops discharging when the voltage on VBUS line 801 reaches the lower voltage level required by the new PD contract.

Figure 9:
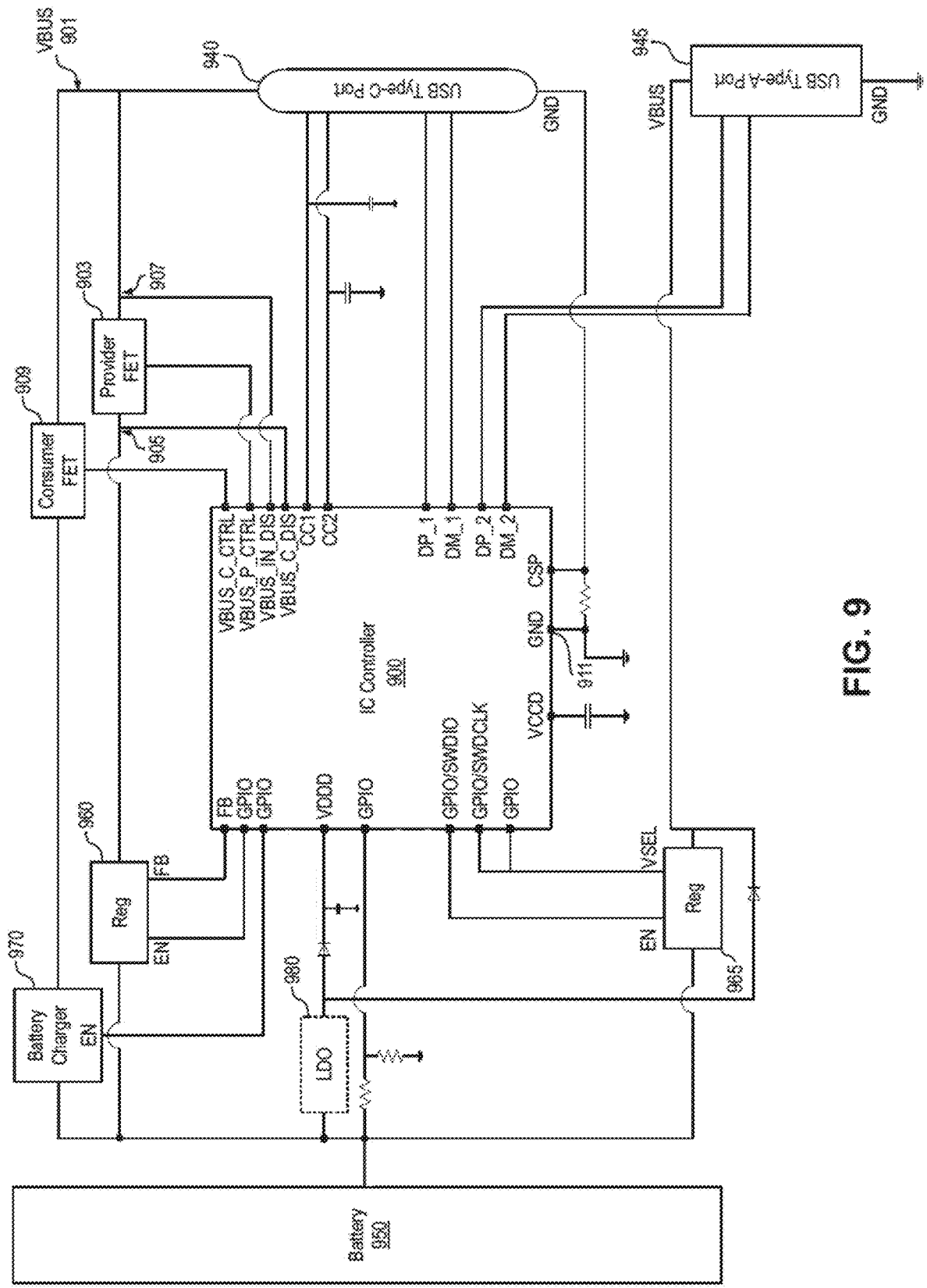
FIG. 9 illustrates a schematic diagram of a USB-PD power bank, according to an example embodiment.

FIG. 9 illustrates an example USB-PD DRP application, according to one embodiment. The system illustrated in FIG. 9 may be a two-port USB Type-A/Type-C power bank configured to operate as either a power source or a power sink or can alternate between these two roles dynamically by using USB-PD power role swap. IC controller 900 may be disposed in a chip package and includes a USB-PD subsystem configured in accordance with the techniques for VBUS voltage discharge described herein. When operating in power source role, IC controller 900 is configured to negotiate a PD contract with a consumer device (not shown) attached to USB Type-C port 940. When operating in power sink role, IC controller 900 is configured to control the charging of battery 950 through USB Type-C port 940. USB Type-C port 940 is typically associated with a Type-C receptacle, but it should be understood that in various embodiments the USB Type-C port may be associated with a Type-C plug instead.

Battery 950 is a DC power source that can be a single battery or a battery pack with multiple batteries coupled in series. Battery 950 is coupled to regulator 960. When IC controller 900 is operating in power source role, regulator 960 is configured to control the voltage provided on VBUS line 901 based on enable and feedback signals from output pins of the IC controller. Battery 950 is also coupled to regulator 965. When IC controller 900 is operating in power source role, regulator 965 is configured to control the voltage provided by the battery on a VBUS line to USB Type-A port 945. Regulator 965 is controlled based on enable and voltage-select signals from output pins of IC controller 900, to provide VBUS voltages and currents in accordance with older USB specifications (e.g., such as the USB 2.0 Specification, the USB Battery Charging Specification Rev. 1.1/1.2, etc.) to charge USB-enabled devices through the USB Type-A port. Battery 950 is also coupled to battery charger 970. When IC controller 900 is operating in power sink role, battery charger 970 is configured to control the voltage that is provided on VBUS line 901 to charge battery 950 based on an enable signal from an output pin of the IC controller. In embodiments in which the battery is a multi-battery pack (e.g., such as a laptop battery pack), a low drop out (LDO) regulator 980 may be coupled between battery 950 and an input pin ("VDDD") of IC controller 900 to provide operating power to the IC controller.

IC controller 900 is coupled to VBUS line 901 and is configured to control the discharge of VBUS voltage during negative voltage transitions thereon. VBUS line 901 includes power switch 903 that is configured as an on/off switch device controlled by signals from an output pin ("VBUS_P_CTRL") of a gate driver in IC controller 900. On one side of power switch 903, a power source node 905 on the VBUS line is coupled to regulator 960, which in turn is coupled to battery 950. Power source node 905 is coupled to an input pin ("VBUS_C_DIS") of IC controller 900. The "VBUS_C_DIS" pin is coupled to an on-die discharge circuit that is configured to pull down current from power source node 905, thereby reducing its VBUS voltage. On the other side of power switch 903, an output node 907 on the VBUS line is coupled to USB Type-C port 940. Output node 907 is coupled to another input pin ("VBUS_IN_DIS") of IC controller 900. The "VBUS_IN_DIS" pin is coupled to another on-die discharge circuit that is configured to pull down current from output node 907, thereby reducing its VBUS voltage. The current pulled down through the on-die discharge circuits of IC controller 900 is driven to output pin ("GND") 911 of IC controller 900. Ground pin 911 is coupled to the ground GND line of USB Type-C port 940. Discharge control logic in IC controller 900 is configured to control the operation of each discharge circuit separately and independently of the other by use of enable and control signals that regulate the timing, duration, and amount of the current conducted by each discharge circuit through the IC controller.

When IC controller 900 operates in power source role, the direction of power flow on VBUS line 901 is from battery 950 to a consumer device, such as a mobile phone (not shown), that is attached to USB Type-C port 940. When a PD contract with the consumer device is negotiated, IC controller 900 turns on power switch 903 and turns off power switch 909, and power is provided to the consumer device at the negotiated voltage and/or current level(s). A negative voltage transition on VBUS line 901 may be needed when the PD contract is dynamically re-negotiated to lower the VBUS voltage and/or current, e.g., when the consumer device has finished charging its battery. In response, discharge control logic in IC controller 900 turns on the on-die discharge circuit(s) to reduce the VBUS voltage at nodes 905 and/or 907, in accordance with the techniques described herein. The discharge control logic turns off the discharge circuits and stops discharging when the voltage on VBUS line 901 reaches the lower voltage level required by the new PD contract.

IC controller 900 is also coupled to power switch 909 to control the charging of battery 950 through USB Type-C port 940, when operating in power sink role. Power switch 909 is coupled on VBUS line 901 between USB Type-C port 940 and battery charger 970 and is configured as an on/off switch device controlled by signals from an output pin ("VBUS_C_CTRL") of a gate driver in IC controller 900.

When IC controller 900 operates in power sink role, the direction of power flow on VBUS line 901 is from a power adapter (e.g., a wall charger) attached to USB Type-C port 940 to battery 950. IC controller 900 turns on power switch 909, turns off power switch 903, and enables battery charger 970 to charge battery 950. Power then flows on VBUS line 901 from USB Type-C port 940 to battery 950 at the voltage and current set by battery charger 970. In this manner IC controller 900 can alternate its operating role to implement a USB-PD DRP application, in various embodiments.

The techniques described herein allow discharge of VBUS line voltage to any of multiple, programmable voltage levels with protection against high currents and live supply discharge, but without requiring any external components such as current-limiting high-wattage resistors. Further, in various embodiments the techniques described herein provide circuitry to reduce the on-die discharge current thereby limiting ground bounce, on-die voltage drop, and the risk of Joule heating.

Various embodiments of the techniques for VBUS voltage discharge described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for VBUS voltage discharge described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An integrated circuit (IC) for controlling power transfer on a Universal Serial Bus (USB) voltage (VBUS) line, the IC comprising:
   a USB Power Delivery (USB-PD) controller disposed in a semiconductor die, wherein the USB-PD controller comprises:
   a first discharge circuit disposed on the semiconductor die, wherein the first discharge circuit is to couple to a power source node on the VBUS line and to drive current, at a first programmable drive-strength, from the VBUS line through the USB-PD controller to a USB ground line;
   a second discharge circuit disposed on the semiconductor die, wherein the second discharge circuit is to couple to an output node on the VBUS line and to drive current, at a second programmable drive-strength, from the VBUS line through the USB-PD controller to the USB ground line; and
   a discharge control logic coupled to the first discharge circuit and to the second discharge circuit, wherein the discharge control logic is to independently control the first discharge circuit and the second discharge circuit to discharge voltage on the VBUS line;
   wherein the discharge control logic is to generate multi-bit control signals that are applied to the first discharge circuit and the second discharge circuit to control the first programmable drive-strength and the second programmable drive-strength, respectively.

2. The integrated circuit of claim 1, wherein the power source node is disposed on one side of a power switch on the VBUS line and the output node is disposed on the other side of the power switch on the VBUS line.

3. The integrated circuit of claim 1, further comprising:
   a first input pin coupled to the first discharge circuit;
   a second input pin coupled to the second discharge circuit; and
   one or more ground output pins coupled to the first discharge circuit and the second discharge circuit.

4. The integrated circuit of claim 1, further comprising firmware instructions to control a drive strength schedule that is applied by the discharge control logic to at least one of the first discharge circuit and second discharge circuit.

5. The integrated circuit of claim 1, wherein the USB-PD controller further comprises a voltage threshold detector logic coupled to the discharge control logic, wherein the voltage threshold detector logic is to monitor the voltage on the VBUS line at the power source node and at the output node.

6. The integrated circuit of claim 5, wherein the voltage threshold detector logic is to monitor the voltage on the VBUS line with respect to multiple voltage levels.

7. The integrated circuit of claim 1, wherein the USB-PD controller further comprises protection logic coupled to the discharge control logic, wherein the protection logic is to monitor a discharge rate of the voltage on the VBUS line.

8. The integrated circuit of claim 7, wherein the protection logic is to protect against discharging a live supply voltage on the VBUS line.

9. The integrated circuit of claim 1, wherein each of the first discharge circuit and the second discharge circuit comprises one or more drain-extended field-effect transistors (DEFETs).

10. The integrated circuit of claim 1, wherein the discharge control logic is to control the first discharge circuit to discharge the voltage on the VBUS line at a first discharge rate and to control the second discharge circuit to discharge the voltage on the VBUS line at a second discharge rate.

11. The integrated circuit of claim 1, wherein the discharge control logic is to stop discharging the voltage on the VBUS line at a non-zero voltage level.

12. The integrated circuit of claim 1, wherein the USB-PD controller further comprises:
a voltage threshold detector logic to monitor the voltage on the VBUS line;
a current sense detector logic to monitor current returned on the USB ground line; and
a fault detector logic coupled to the current sense detector and to the voltage threshold detector, wherein the fault detector logic is to detect one or more fault events on the VBUS line.

13. An apparatus comprising:
a Universal Serial Bus (USB) Type-C connector, the USB Type-C connector comprising a voltage (VBUS) line and a USB ground line; and
an integrated circuit (IC) controller disposed in a semiconductor die and coupled to control power transfer on the VBUS line, the IC controller comprising:
a first discharge circuit disposed on the semiconductor die, wherein the first discharge circuit is coupled to a power source node on the VBUS line and is to drive current, at a first programmable drive-strength, from the VBUS line through the IC controller to the USB ground line;
a second discharge circuit disposed on the semiconductor die, wherein the second discharge circuit is coupled to an output node on the VBUS line and is to drive current, at a second programmable drive-strength, from the VBUS line through the IC controller to the USB ground line; and
a discharge control logic coupled to the first discharge circuit and to the second discharge circuit, wherein the discharge control logic is to independently control the first discharge circuit and the second discharge circuit to discharge voltage on the VBUS line;
wherein the discharge control logic is to generate multi-bit control signals that are applied to the first discharge circuit and the second discharge circuit to control the first programmable drive-strength and the second programmable drive-strength, respectively.

14. The apparatus of claim 13, further comprising a power switch coupled on the VBUS line, wherein the power source node is disposed on one side of the power switch and the output node is disposed on the other side of the power switch.

15. The apparatus of claim 13, wherein the IC controller comprises:
a first input pin that couples the first discharge circuit to the power source node;
a second input pin that couples the second discharge circuit to the output node; and
one or more ground output pins that couple the first discharge circuit and the second discharge circuit to the USB ground line.

16. The apparatus of claim 13, wherein the IC controller is configured to control transfer of power over the VBUS line in accordance with a USB Power Delivery (USB-PD) specification.

17. The apparatus of claim 13, wherein the IC controller is configured to control a discharge rate of the voltage on the VBUS line.

18. The apparatus of claim 13, wherein the IC controller is configured to monitor the voltage on the VBUS line with respect to multiple voltage levels.

19. The apparatus of claim 13, wherein the apparatus is one of a personal computer (PC) power adapter, a mobile phone charger, a wall socket, a car charger, and a power bank.

* * * * *